Aug. 13, 1968 — C. E. SLOOP — 3,397,346
METER BOX AND LINER
Filed Sept. 8, 1965 — 7 Sheets-Sheet 1
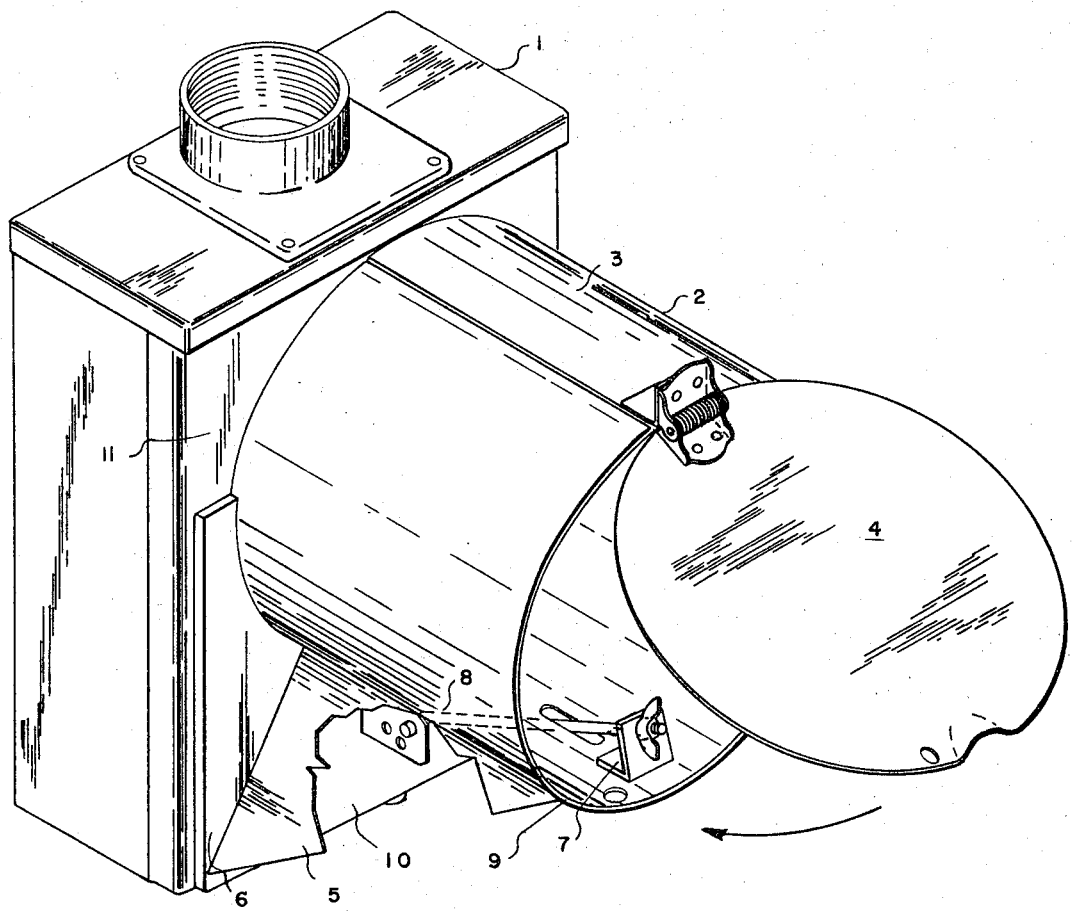
Fig. I
INVENTOR
CLIFFORD E. SLOOP
BY *Newton, Hopkins, Jones & Ormsby*
ATTORNEYS Aug. 13, 1968     C. E. SLOOP     3,397,346
METER BOX AND LINER
Filed Sept. 8, 1965     7 Sheets-Sheet 2
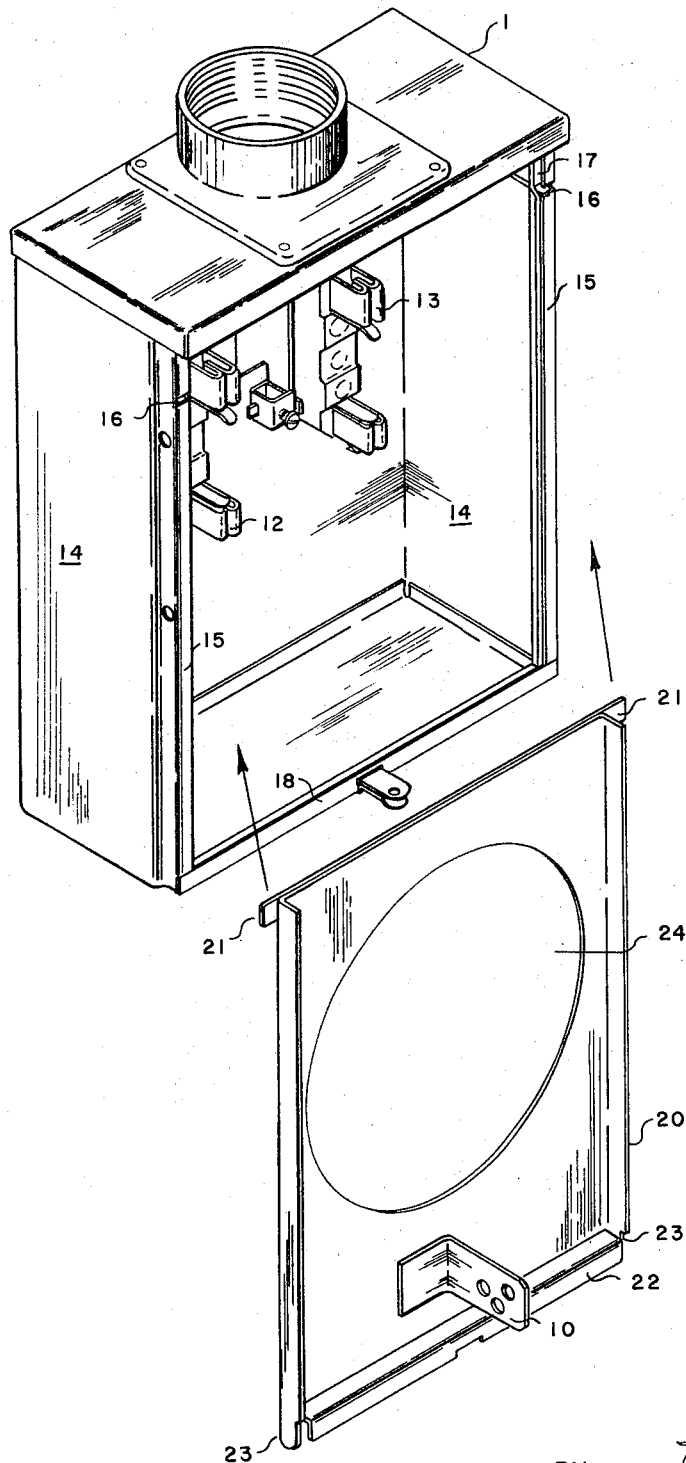
Fig. II
INVENTOR
CLIFFORD E. SLOOP
BY
ATTORNEYS

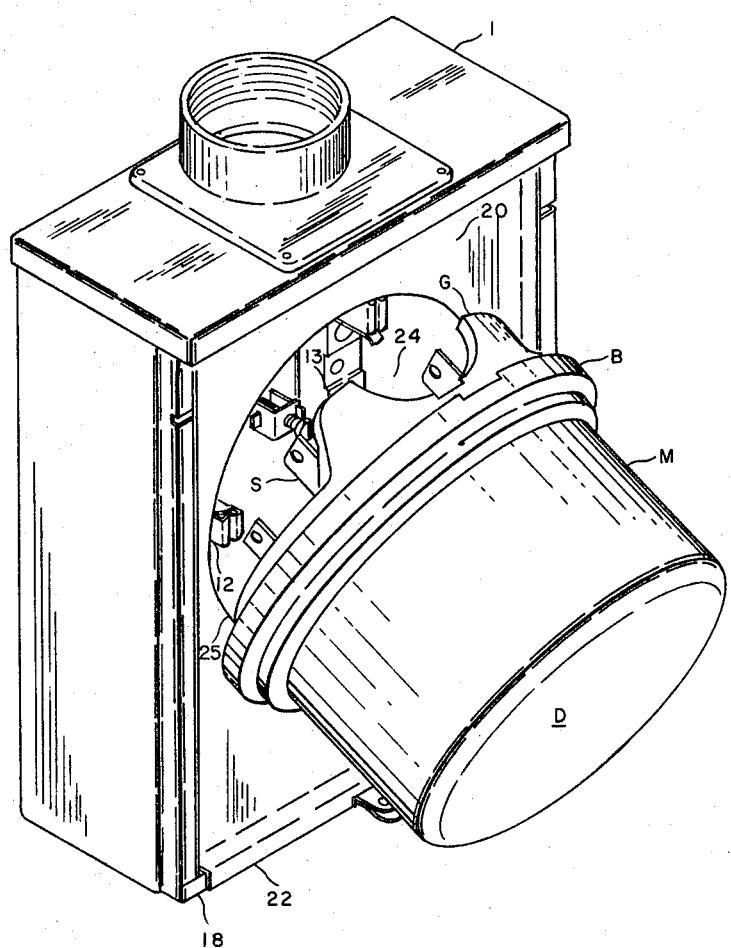
Fig III

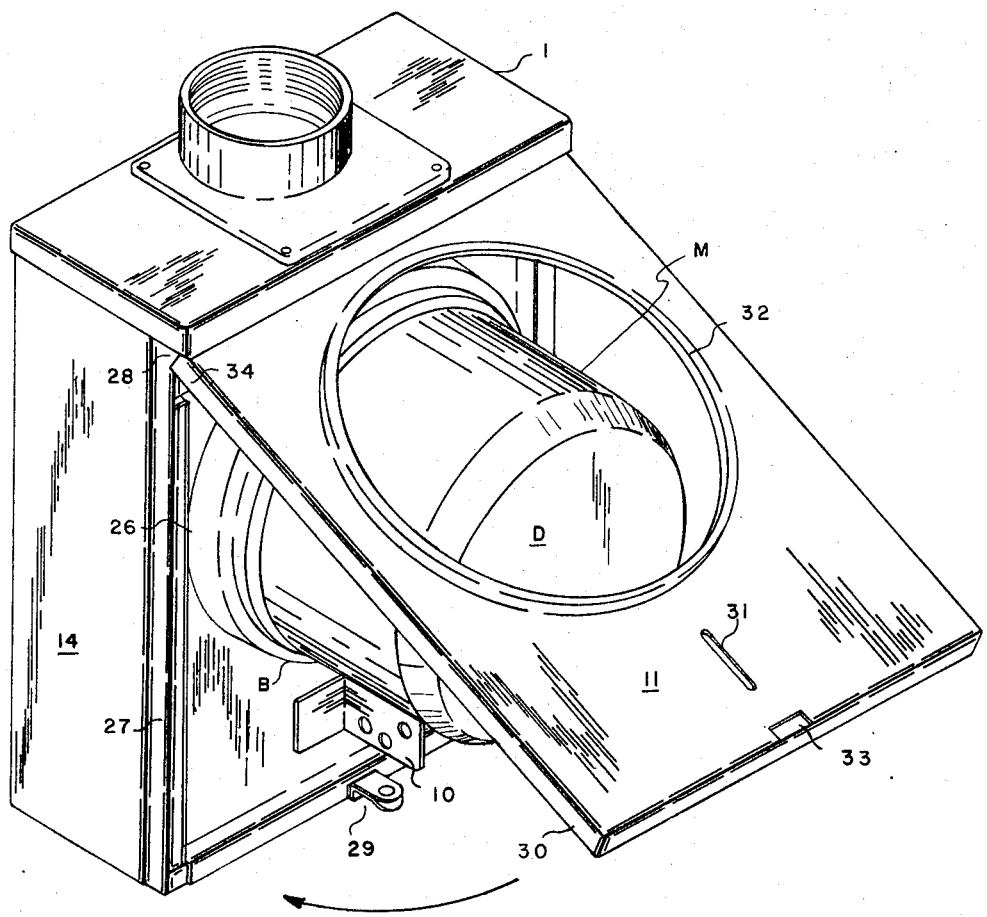
Fig. IV

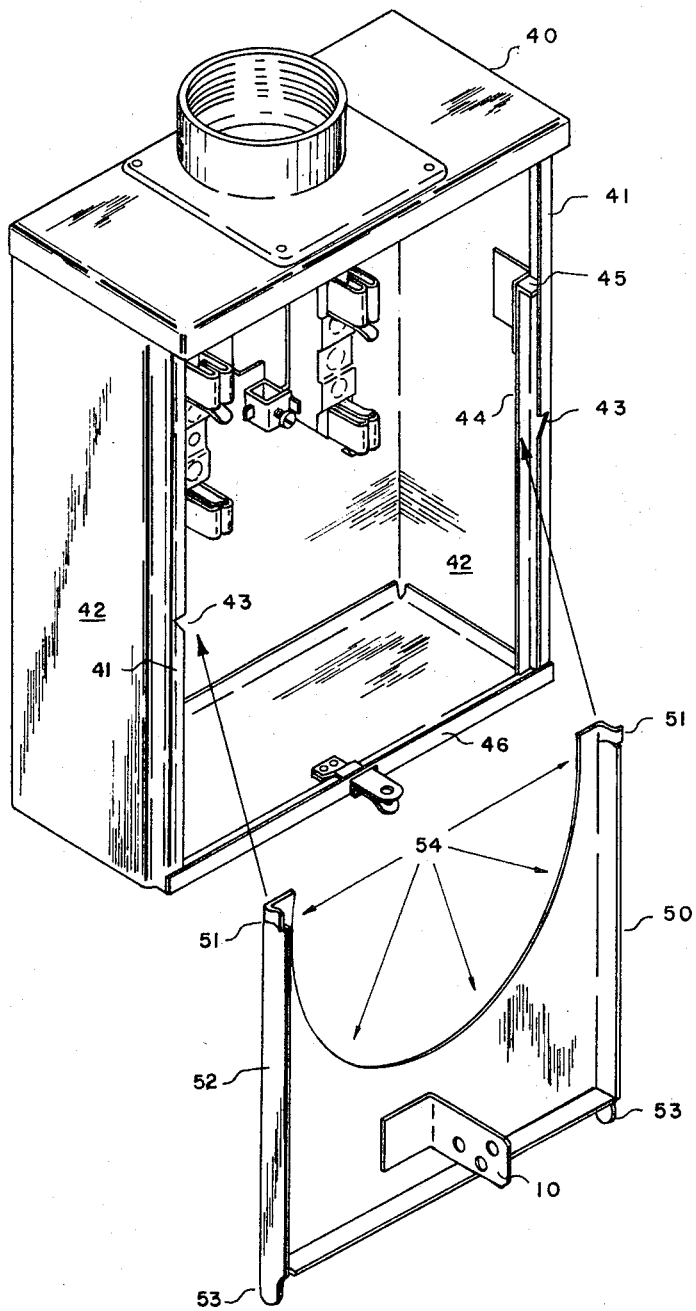
Fig. V

Aug. 13, 1968  C. E. SLOOP  3,397,346
METER BOX AND LINER
Filed Sept. 8, 1965  7 Sheets-Sheet 6
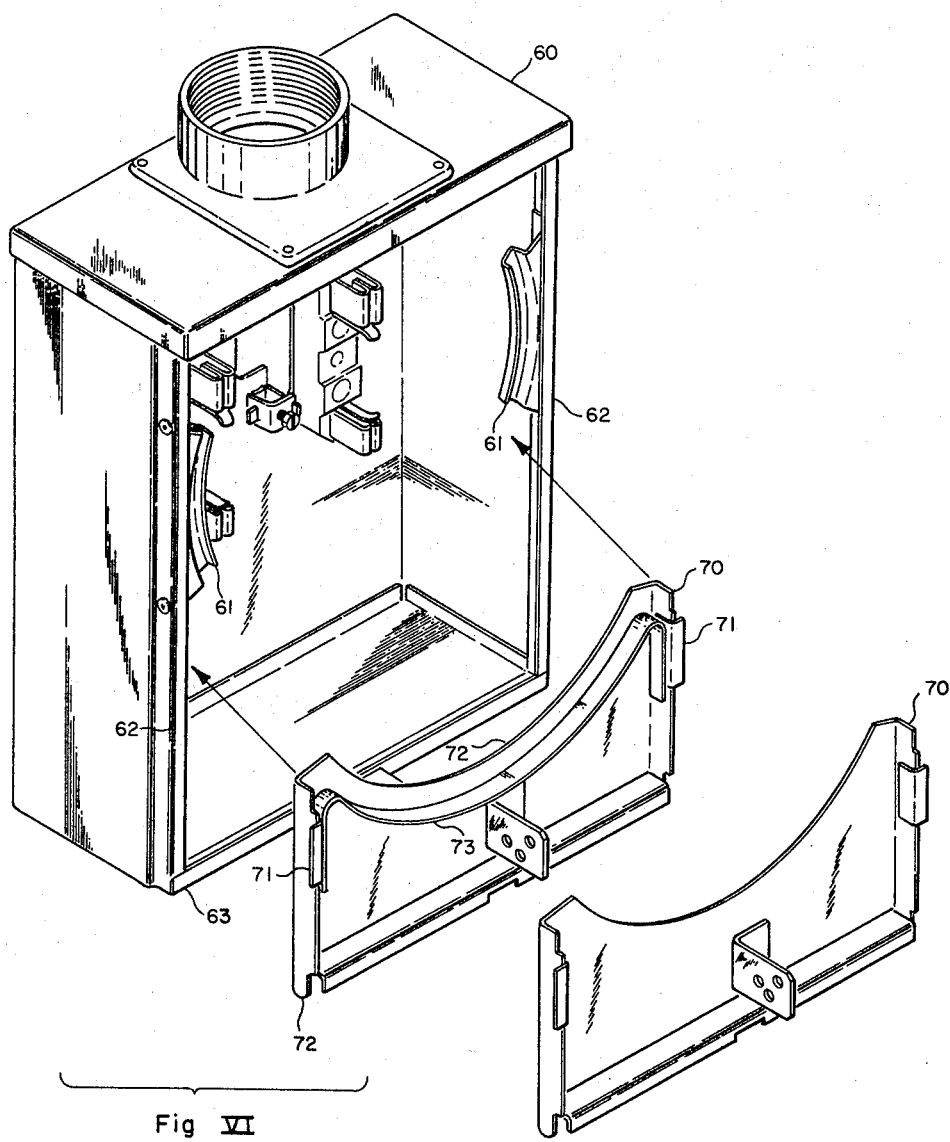
Fig VI
Fig VII
INVENTOR
CLIFFORD E. SLOOP
BY *Newton, Hopkins,
Jones & Ormsby*
ATTORNEYS

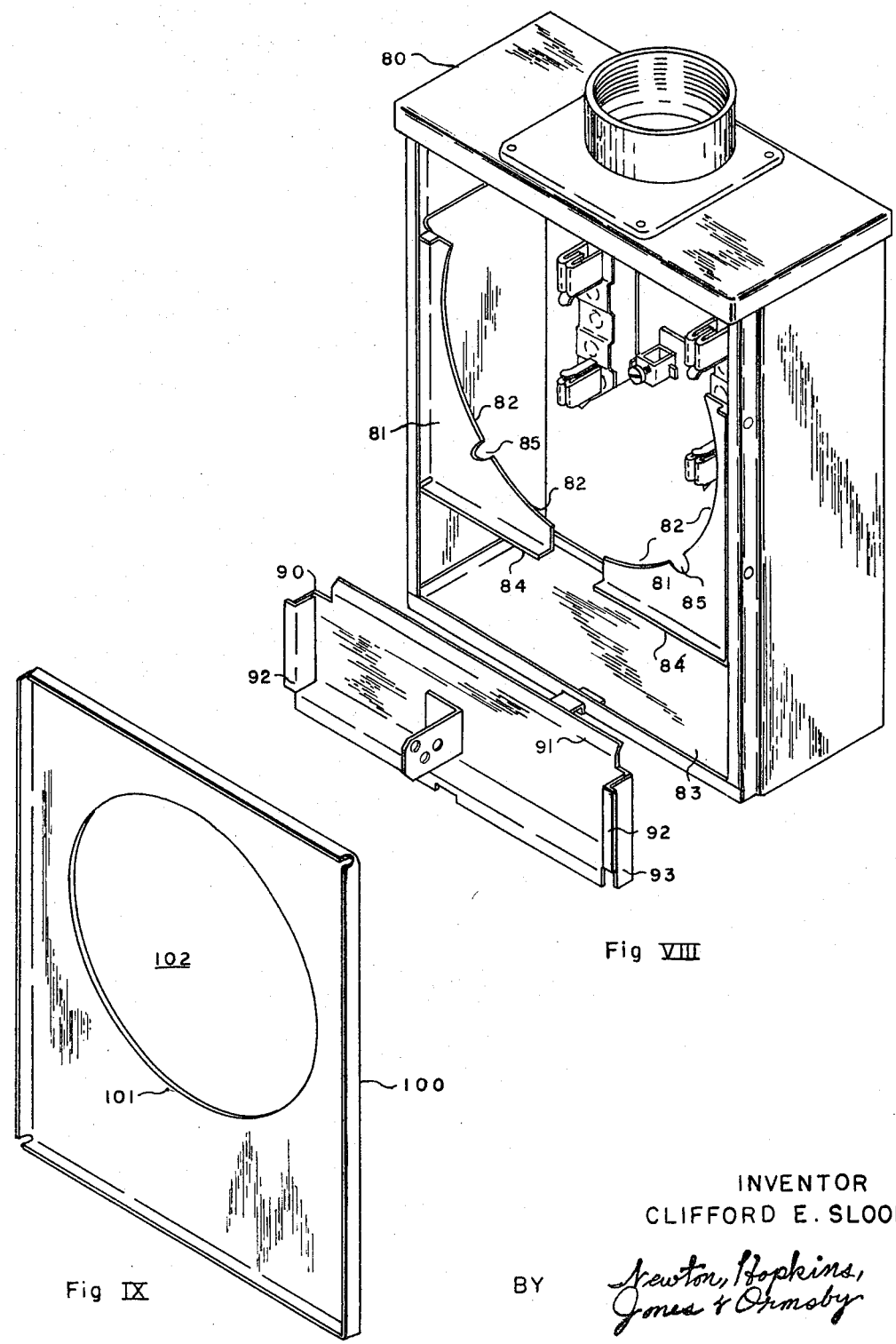
Fig VIII
Fig IX
INVENTOR
CLIFFORD E. SLOOP
BY Newton, Hopkins, Jones & Ormsby
ATTORNEYS

United States Patent Office 3,397,346
Patented Aug. 13, 1968

3,397,346
METER BOX AND LINER
Clifford E. Sloop, 2230 10th St.,
Columbus, Ga. 31906
Filed Sept. 8, 1965, Ser. No. 485,844
17 Claims. (Cl. 317—104)

ABSTRACT OF THE DISCLOSURE

A meter box for electricity meters having a removable liner to cover the opening of the box. The liner defines a central opening for receiving the electrical connections of a meter but is of a size to engage the base of the meter, thus functioning to guide the meter into proper alignment with the sockets of the meter box, and weather proofing the meter box.

---

A number of disadvantages exist with conventional ringless meter boxes. Installation of a meter into these conventional meter boxes requires that the installer expose his eyes and face to dangerous flashes due to arcing which can occur if there is a fumble when placing the spades of the meter into the jaw-type receptacles mounted on the back wall within the meter box. This is due to a lack of vertical support or guide means on the meter box to insure a sure, smooth matching between the meter spades and the jaws. Also, there is no shielding from the flash caused by the above described arcing. The obvious results are possible personal injury to the installer and damage to the meter.

A further disadvantage resulting directly from the lack of vertical support and guiding for the meter lies with present methods of disconnecting service. Utilities now use plastic disconnect sleeves that are put on the meter spades and the meter is re-inserted into the jaw-type receptacles. The sleeves prevent electrical contact between the spades and the receptacles. In order to accommodate the sleeve covered spades the receptacles must expand beyond that degree of opening they originally intended. As a result the receptacles fail after a number of disconnects. In addition the sleeves wear out and there results a possibility of an ineffective disconnect.

Another disadvantage of conventional ringless meter boxes is in the degree of weatherproofing afforded. Weatherproofing is presently dependent entirely upon binding the front cover on the front of the installed meter base which must be slightly forward of the plane defining the face of the meter box. In this bind the front cover is held in a bowed position under tension by a single latch. As a result the front covers frequently come loose from the latch and thereby allow water to gain entry to the interior of the meter box. The water then causes deterioration of the electrical wires, conduits and the terminals which results in considerable maintenance expense.

A further disadvantage is that these meter boxes are not tamper proof. The covers are merely secured by a single latch at the bottom edge and consequently may be pried open at the top without breaking the lock attached to the latch. Once opened in this manner, unauthorized adjustments in meter readings may be made without detection.

The glass portions of the meters which extend through the covers of the meter boxes present another problem as they are often the target of vandalism. In an attempt to solve this problem, utility companies have placed metal hoods over the extended glass portion of the meter. These metal hoods have been bolted to the cover using several screws. Due to the amount of labor required, the attachment of these hoods has often been neglected by meter installers and considerable breakage has resulted.

The present invention overcomes these disadvantages by providing a novel liner and hood attachment for meter boxes. Certain embodiments of the present invention may be used with existing and presently installed meter boxes to overcome the above-enumerated disadvantages. Other embodiments may be incorporated into new meter boxes with but slight change of design to also overcome these disadvantages.

Therefore, it is an object of the present invention to provide a new meter box having means for vertical support and guiding during and after meter installation, possesses a substantial increase in the degree of weatherproofing, provides partial or total shielding from any flash due to arcing, possesses a greater deterent capability from unauthorized tampering and provides for increased ease in installation of a protective hood by the installer.

Another object of the present invention is to provide a new meter box having an easily attachable protective hood.

Further object of the present invention is to provide a new meter box having a novel securing means for the cover to prevent tampering or at least making it possible for detection of any tampering.

Another object of the present invention is to provide a new meter box having a novel securing lug attached to the interior of the meter box whereby a front cover may be secured to the box in a manner which deters tampering.

Another object of the present invention is to provide a new meter box having a liner which provides vertical support and guiding means during and after installation of a meter.

Another object of the present invention is to provide a new meter box having novel weatherproofing means and characteristics.

Another object of the present invention is to provide a new meter box which shields the installer from flashes due to arcing while installing the meter.

Another object of the present invention is to provide an easily installed protective hood for meter boxes.

Another object of the present invention is to provide a means secured to the outer cover of a conventional meter box by which a protective hood may be installed.

Another object of the present invention is to provide a liner for meter boxes which provides vertical support and guiding means while installing the meter into the box.

Another object of the present invention is to provide a liner for meter boxes which supports the meter after installation.

Another object of the present invention is to provide a liner for meter boxes which imparts improved weatherproofing characteristics to the box.

Another object of the present invention is to provide a liner for meter boxes which shields the installer from flash due to arcing while installing a meter.

Another object of the present invention is to provide support for a meter during and after rotational disconnect to prevent fumbles which could result in flashes.

Another object of the present invention is to provide a liner for weatherproofing a meter box while eliminating the necessity for front cover bind.

These and other objects of the present invention will become apparent upon a reading of the following discussion with reference to the accompanying drawings wherein:

FIGURE I is a view of the completely assembled meter box and protective hood of the present invention.

FIGURE II is a view of one embodiment of the present invention showing an open meter box and a full liner.

FIGURE III is a view of the embodiment of FIGURE II wherein the liner has been assembled into the meter box and a meter is being guided into position.

FIGURE IV is a view of the assembled meter box of

FIGURE III wherein the meter has been mounted therein and the front cover has been placed partially in position.

FIGURE V is a view of a second embodiment of the present invention showing an open meter box and a three-quarter-size liner.

FIGURE VI is a view of another embodiment of the present invention showing a conventional open meter box and a one-half-size liner.

FIGURE VII is a view of a modified version of the liner shown in FIGURE VI.

FIGURE VIII is a view of another embodiment of the present invention showing a substantially modified open meter box and a one-quarter liner.

FIGURE IX is a view of a full liner which may be employed in a meter box of any exterior dimensions.

Referring to FIGURE I, there is shown a completely assembled meter box 1 having a protective hood 2 mounted on the front thereof over the glass portion of a protruding meter. The meter box is generally of conventional exterior design and will be discussed in more detail later in connection with the other drawings.

The protective hood 2 comprises cylindrical member 3 having a lid 4 which is hinged at one point so that it may be opened for reading the meter inside. The lid may be locked in a closed position by inserting a lock through corresponding holes in the lid and the cylindrical member 3. The cylindrical member is externally supported by angles 5 on each side, only one of which is visible. Greater stability of these angles is provided by base 6 which extends between the two supports and partially around cylindrical member 3.

Installations of the protective hood 2 on the meter box 1 is extremely simple, there being but a single securing member. As shown partially in dotted lines in FIGURE I, a coupling member 7 is attached to the inner surface of the cylindrical member 3. Rod 8 passes through the coupling member and outward from the bottom side of the cylindrical member by way of a slot 9. The rod exends beyond and is attached at its other end to the front cover securing lug 10. This lug is secured to an internal liner mounted within the meter box which will be discussed more fully hereinafter. The lug protrudes through slots in front cover 11 and the base 6 thereby exposing it for attachment of rod 8. By means of a wing nut or other similar device the rod 8 may be placed under sufficient tension to maintain the protective hood snugly against front cover 11. If the lug 10 is employed only to secure the protective hood it may be attached to the front cover rather than the liner.

Thus, it should be apparent that the relatively simple arrangement and attachment means of the protective hood provides complete protection for the glass meter without requiring excessive man-hours, tools and parts.

The internal structure of meter box 1 may be seen in FIGURE II. As shown therein, conventional jaw-type receptacles and connector blocks, indicated by numerals 12 and 13, are mounted on the rear wall. Opposite side walls 14 of the meter box are provided with front lips 15 having slots 16 near the top of the box. Communicating with these slots from within the box are runways 17, only one of which is visible.

The novel liner 20 of the present invention is shown immediately below meter box 1 with guide arrows indicating the manner in which it assembles into the front of the meter box. The liner 20 has lugs 21 attached at its upper edge on opposite sides. These lugs assemble through slots 16 in the lips of the two side walls of box 1 and slide into runways 17 thereby guiding the upper portions of the liner in place. These runways serve to prevent the liner from entering the box during insertion to the extent that it comes into contact with the "live" jaw-receptacles mounted on the back wall.

At the bottom of the liner there is shown a lip 22 and lugs 23. In placing the bottom portion of the liner into the meter box the liner is pushed as far as possible up into runways 17. This allows lugs 23 at the bottom of the liner to clear lower lip 18 of the meter box. Once lugs 23 are so located the liner is slid downward thereby positioning the lugs underneath lip 18 while lip 22 of the liner slips over lip 18. The liner is then locked in place.

As indicated in FIGURE II, liner 20 has an opening 24 which is in alignment with the meter connecting means 12 and 13 mounted on the rear wall. Opening 24 is of such a size that the guards and spades of a meter may pass therethrough for mounting in the connecting means 12 and 13. It is not, however, large enough for the base plate of a meter to pass. This will be explained in more detail in connection with FIGURES III and IV. The opening may vary in configuration, being dependent upon the configuration of the meter and the connecting means for mounting the meter.

Also shown attached to liner 20 is a front cover securing lug 10 whose function was partially described in connection with the protective hood. As was mentioned at that point, the lug projects outward from the meter box through a slot in the front cover. In addition to functioning as an anchor means for attaching the protective hood to the meter box, the lug 10 serves as a means by which the front cover may be locked onto the meter box. Any attempts to tamper with the meter box thereafter would require destruction of the cover.

It is emphasized that this lug may be employed with conventional meter boxes without a liner to secure the front cover to the box. In these instances the lug is attached to the interior of the box in any well known manner such as welding, bolted, riveted, and the like. The attachment is, however, such that the lug extends through the cover at a point remote from the cover edges. In this manner any tampering with the meter would require destruction of the front cover and possibly the meter box.

If the lug 10 is used only to secure the protective hood it may be attached to the outer cover rather than the liner or interior of the meter box.

The lug 10 is an optional feature and need not be employed if not desired.

A meter M is shown being mounted into meter box 1 in FIGURE III. Liner 20 has been previously assembled within the meter box and, as shown near the bottom thereof, lip 22 of the liner is in position over lip 18 of the meter box.

Meter M is a conventional-type electric meter found in most homes, apartments, factories, office buildings, and the like. It consists of a dial portion D and base B with guards G and spades S mounted on the bottom thereof.

When installing a meter the installer merely places the lower pair of meter guards G on the lower edge 25 of opening 24 in liner 20. This not only supports the meter but vertically locates the spades S with respect to the connecting means 12 and 13 on the rear wall of the meter box. In most instances the installer's judgment will usually have the spades aligned properly in the other direction. If not, slight rotation of the meter while it rests on edge 25 until the dial hands are horizontal will bring the spades into alignment. The meter is easily installed by pushing upward and inward whereupon the spades S of the meter engage and become clamped in the connecting means 12 and 13.

It should be apparent that any flash occurring as a result of arcing is contained within the meter box behind the liner 20 and meter M.

The installation operation, thus, is not only easier but becomes much safer for the installer.

The installed meter M is shown in FIGURE IV. The base B of the meter fits flush at 26 against the peripheral edge portion of opening 24. In this manner the electrical connections within the meter box are substantially weatherproofed in the event water gains entry behind the front cover 11. Any water which does get behind the front cover is trapped by the liner and is funneled out between the lower edge of the liner and the front cover.

The meter may also be installed so that the front surface of the base is flush with the lips 15 of side walls 14. This is provided by merely mounting the receptacles 12 and 13 in a suitable manner further back in the box. This eliminates the bind on the front cover which was previously necessary for weatherproofing when a liner was not present in the meter box. Weatherproofing in this instance is still provided by the sealing fit between the liner and meter base.

The front cover 11 of the meter box is installed in the usual manner. The upper edge 34 is inserted under the upper lip 28 of meter box 1. Thereafter the cover is pivoted downward, whereupon the opening in the cover defined by the edge 32 slips over the glass dial D of the meter M. The narrow sides 30 of the cover fit down over the recessed portions 27 of the side walls 14. The front cover securing lug 10 passes through slot 31 and the conventional retaining means 29, which may or may not be present, passes through slot 33.

With the front cover in place a lock may be placed on the lug 10 extending therethrough. It should then be apparent that any tampering with the meter would require actual bending of the cover 11 as opposed to mere prying in order to gain entry to the meter box.

Referring next to FIGURE V, there is shown a second embodiment of the present invention. Therein is shown a meter box 40 which is of similar construction to that of the previous illustrations. However, as indicated therein, the lips 41 of the side walls 42 are notched at 43 approximately midway along their height. Immediately beneath each notch is positioned a long runway or ledge 44, only one of which is visible. These runways serve also to prevent electrical contact between the liner and the live receptacles when inserting the liner. The runways extend along the side walls from the bottom of the meter box to a point approximately three-quarters of the height of the side walls. At the uppermost point on the runways, stops are positioned. The stops function to maintain the liner in position in the lower part of the meter box.

The liner 50, shown below meter box 40, assembles into the box as indicated by the guide arrows Specifically, the liner 50 has two lugs 51 located at the uppermost point. These lugs may be formed integral to the liner by merely bending a portion of the upper part of the liner in an appropriate manner. When assembling the liner into meter box 40 the lugs 51 are inserted through notches 43 and the edge portions 52 of the liner are allowed to rest against the runways 44. As in the embodiment shown in FIGURE II, the liner may be moved sufficiently upward to allow lugs 53 at the bottom of the liner to clear the lower lip 46 of meter box 40. Thus located, the liner is slid downward and becomes held in place by the combined action of the upper lugs 51 and the lower lugs 53.

As indicated by numeral 54, the upper edge of liner 50 is cut away. This cut-away section is aligned with the meter connecting means mounted on the rear wall of the meter box 40. The area and configuration of the cut-away section are again determined by the particular meter and meter connecting means, the important considerations being that there be sufficient room for the passage of the guards and spades of a meter when it is mounted within the box while at the same time allowing the peripheral portions of the liner adjacent the cut-away section to engage the meter base in a sealing manner as described in reference to FIGURE IV.

Liner 50 is also provided with a front cover securing lug 10 for the same purposes previously herein described. As is apparent this lug may be omitted and the front of the meter box fitted with a conventional front cover.

With liner 50 assembled within meter box 40, a meter is installed in the same manner as discussed in reference to FIGURE III. The upper edge 54 of the liner supports the meter by its guards and aids in guiding the spades into the connecting means mounted on the rear wall of the meter box.

Since the liner encloses nearly all of the open area of the front of the meter box, flashes due to arcing are substantially shielded from the meter installer. Also, with edge 54 of the liner in sealing engagement with the lower half of the meter base, any water which gains entry through the front cover is directed out of the meter box through the bottom.

Another embodiment of the present invention is shown in FIGURE VI. This figure indicates the manner in which presently existing meter boxes may be adapted to the present invention.

A conventional type meter box 60 is illustrated which is much the same as those previously described with the exception that the side walls and lips have no means for receiving or supporting a liner. Rather, the sole means for aiding the insertion of a meter in these boxes is provided by members 61, commonly referred to as funnels. As is apparent, these funnels provide no shielding nor do they vertically support or guide the insertion of a meter. At most, the funnels may serve to laterally position the meter. Also, it can readily be seen that all frontal support as well as weatherproofing must be provided by the front cover binding on the meter. Any water gaining entry behind the front cover is free to reach the rear of the meter and the connecting means and thereby cause failure.

This meter box may be converted to the type of the present invention by assembling liner 70 within meter box 60 in manner indicated by the guide arrows in FIGURE VI. As shown, liner 70 has two small flanges 71 on opposite sides thereof. These flanges engage the lips 62 of the side walls of the meter box thereby supporting and maintaining the upper portion of liner 70 in position. At the bottom of the liner are lugs 72, only one of which is visible, just as on the previously discussed liners. These lugs slip under the lower lip 63 of the meter box. The upper edge 74 of the liner is again partially cut away but only to a very limited extent since liner 70 is much smaller than those previously discussed. The upper edge 74 of the liner communicates in such a manner with the inside edged of funnels 61 that a substantially continuous surface is formed. The opening formed by the liner and funnels is such that a meter may be installed while at the same time being in sealing engagement with the liner.

The liner may be fitted with a front cover securing lug 10. However, an additional feature not previously shown is that of rim 73. The rim is located near liner edge 74 and has a configuration which corresponds to the peripheral portion of the base of a meter to be mounted. When a meter has been installed, rim 73 engages the meter base and provides support. Any conventional means may be used to attach the rim to the liner. This rim may be used with any of the liners discussed hereinbefore and in the case of the full liner it may be placed at the top as well as the bottom.

As shown in FIGURE VII, a liner 70' identical to liner 70 of FIGURE VI with the exception of the rim 73 may also be employed with meter box 60.

FIGURE VIII illustrates another embodiment of the present invention wherein there is shown a meter box 80 having many of the same features as the previously discussed meter boxes. However, rather than the conventional funnels as shown in FIGURE VI, complementary members 81 are mounted on the opposite side walls by such means as rivets, welding, clamps, or even hinges so as to allow the members to pivot outward.

As illustrated, the upper edges 82 of the complementary members 81 define an almost continuous surface for supporting and guiding a meter being mounted in the box. A gap remains between the lower portions of the members 81 so that water may drain onto the insert liner 90 to be discussed later. Slots 85 are also provided in the continuous surface 82 to allow for insertion of a tool for adjusting the connecting means mounted on the rear wall. The members 81 do not extend to the uppermost part of the box configuration of the supporting and guiding surface 82 maintained to allow passage of the meter spades and guards. The members 81, also, do not extend to the bottom edge of the meter box. This open space 83 is provided to allow access to the electrical wiring, entering the bottom of the box and the lower connections. Water, however, is still directed away from the meter by members 81 thereby providing a substantial degree of weatherproofing.

A small insert liner 90 is designed for insertion into space 83 for shielding flashes and also to aid in weatherproofing by directing any water out of the bottom of the box. The insert liner, in this case, does not have the upper supporting and guiding surface as in the previously discussed liners since that feature is provided by members 81. There is, however, an upper edge 91 which is bent inward somewhat so as to slip behind lower edges 84 of members 81 when this liner is inserted into the box. The insert liner is otherwise supported and maintained in position by flanges 92 and lower lugs 93 which cooperate in the same manner as discussed with respect to FIGURE VI.

Again, a front cover securing lug 10 may be attached to the insert liner 90.

The full liner 100 illustrated in FIGURE IX exemplifies the versatility of the present inventive concept. The liner shown is intended for use within large meter boxes in the immediate area around the terminals and the meter. The liner is secured in any suitable manner such as by braces extending to the rear wall. As is apparent, the liner 100 will provide the same functions as those liners previously described. The edge 101 surrounding hole 102 provides support and guiding when inserting a meter. The remaining portion of the liner provides shielding from flashes and also serves to prevent water from reaching the meter spades and connecting means behind the liner. The optional front cover securing lug may also be attached although not illustrated.

It should be apparent from the previous description of the various embodiments that the following advantages are obtained with the present invention:

(1) Increased safety by reducing the chances for meter fumbles during installation or disconnect.

(2) Increased safety by shielding flashes which may occur from the meter installer.

(3) Increased weather proofing by sealing the meter from within the meter box thus eliminating the necessity for cover bind.

(4) Deterring unauthorized tampering and resulting loss of revenue from undetected service.

(5) Preventing breakage due to vandalism and consequently reducing replacement costs.

(6) Overall reduction in maintenance costs.

These enumerated advantages are not meant to be exclusive as many others may well become apparent upon employment of the present invention.

Thus, having described the present invention by way of several embodiments, it will be obvious to those skilled in the art that many modifications and changes may be made without departing from the spirit and scope of the appended claims.

I claim:
1. A meter box comprising:
 (a) a back wall having meter connecting means mounted thereon;
 (b) side walls projecting from said back wall;
 (c) a liner positioned across and covering at least a portion of the front of the meter box, said liner having a portion thereof for engaging the periphery of the base of a meter mounted in the meter box and a front cover securing member mounted thereon remote from the liner edges and extending outwardly from the meter box;
 (d) and a front cover attached to the front of the meter box outwardly of the liner, said front cover having a first opening therein through which the glass portion of a meter may protrude and a second opening through which the front cover securing member extends.

2. A meter box comprising:
 (a) a back wall having meter connecting means mounted thereon;
 (b) side walls projecting from said back wall;
 (c) a liner positioned across and covering at least a portion of the front of the meter box, said liner having a portion theerof for engaging the periphery of the base of a meter mounted in the meter box and a front cover securing member mounted remote from the liner edges and extending outwardly from the meter box;
 (d) a front cover attached to the front of the meter box outwardly of the liner, said front cover having a first opening therein through which the glass portion of a meter may protrude and a second opening through which the front cover securing member extends;
 (e) and a hood positioned on the front cover surrounding said first opening and secured in place by a member attached at one end to the interior of the hood and at the other end to the front cover securing member.

3. A meter box comprising:
 (a) a back wall having meter connecting means mounted thereon;
 (b) top, bottom and vertical side walls;
 (c) a liner supported by the bottom wall and positioned across and co-extensive with the front of the meter box, said liner having an opening therein through which a meter may be mounted and of such size that the liner engages the periphery of the base of a meter when mounted;
 (d) means on said liner for directing downwardly flowing water on said liner outwardly over the forward edge of said liner;
 (e) and a front cover for attachment to the front of the meter box over the liner, said front cover having an opening therein through which the glass portion of a meter may protrude.

4. A meter box according to claim 3 wherein the vertical side walls have inwardly extending lips on their front edges, a pair of slots extending through the vertical side wall lips with runway supporting means attached to the vertical side walls immediately below the slots, and a pair of lugs located on opposite sides of the liner for insertion through the vertical side wall slots and engagement with the runway supports.

5. A meter box according to claim 3 wherein the liner has a front cover securing member attached thereto remote from the liner edges and the front cover has a second opening through which said securing member extends.

6. A meter box according to claim 5 wherein a hood is mounted on the front cover surrounding the first mentioned opening and secured in place by a member attached at one end to the interior of the hood and at the other end to the front cover securing member.

7. A meter box comprising:
 (a) a back wall having meter connecting means mounted thereon;
 (b) top, bottom and vertical side walls;
 (c) a liner positioned across the front of the meter box co-extensive with and extending along approximately three-quarters of the height of the vertical side walls, said liner having an arcuate portion at the upper end thereof which engages in a sealing manner the corresponding portion of the periphery of the base of a meter mounted in the meter box, said liner having a bottom edge portion resting on said bottom;

(d) and a front cover for attachment to the front of the meter box over the liner of a configuration to completely cover the liner, said front cover having an opening therein through which the glass portion of a meter can protrude.

8. A meter box according to claim 7 wherein the vertical side walls have inwardly extending lips on their front edges, a pair of slots extending through the vertical side wall lips with runway supporting means attached to the vertical side walls immediately below the slots, and a pair of lugs located on opposite sides of the liner for insertion through the vertical side wall slots and engagement with the runway supports.

9. A meter box according to claim 7 wherein the liner has a front cover securing member attached thereto remote from the liner edges and the front cover has a second opening through which said securing member extends.

10. A meter box according to claim 9 wherein a hood is mounted on the front cover surrounding the first mentioned opening and secured in place by a member attached at one end to the interior of the hood and at the other end to the front cover securing member.

11. A meter box including upwardly extending side walls and a bottom wall, a cover connectable to the meter box to close the front of the meter box, a liner comprising a flat member for insertion within the front portion of the meter box below the cover which closes the meter box, said member being of such dimensions that it is supported by and substantially encloses the lower portion of the meter box and extends partially upward from the bottom portion of the meter box along the sides thereof, said member also having a cut-away portion along its upper edge for engaging in a sealing manner a corresponding portion of the base of a meter when mounted in the meter box.

12. A meter box comprising:
(a) a back wall having meter connecting means mounted thereon;
(b) top, bottom and vertical side walls, said vertical side walls having partial guide funnels attached thereto;
(c) a liner supported by said bottom and positioned across the front of the meter box substantially enclosing the lower portion thereof, the upper edge of the liner having a partially cut-away portion for engaging in a sealing manner the corresponding peripheral portion of the base of a meter mounted in the meter box;
(d) and a front cover attached to the front of the meter box and extending entirely over the liner and funnels, said front cover having an opening therein through which the glass portion of a meter may protrude.

13. A meter box according to claim 12 wherein the liner has a front cover securing member attached thereto remote from the liner edges and the front cover has a second opeening through which said securing member extends.

14. A meter box according to claim 12 wherein a hood is mounted on the front cover surrounding the first mentioned opening and secured in place by a member attached at one end to the interior of the hood and at the other end to the front cover securing member.

15. A meter box comprising:
(a) a back wall having meter connecting means mounted thereon;
(b) top, bottom and vertical side walls;
(c) said vertical side walls having complementary meter guiding and sealing members attached thereto, said members having complementary upper edges for vertically supporting and guiding a meter into the box and sealingly engaging the periphery of the base of a meter ounce mounted;
(d) a front cover for attachment to the front of the meter box over the said complementary members, said front cover having an opening therein through which the glass portion of a meter may protrude;
(e) the complementary meter guiding and sealing members being attached to the vertical side walls in such a manner as to define an opening in the lower portion of the meter box; and,
(f) an insert liner for enclosing the said lower opening in the front of the meter box.

16. A meter box according to claim 15 wherein the insert liner has a front cover securing member attached thereto remote from the liner edges and the front cover has a second opening through which said securing member extends.

17. In a meter box of the type having a back wall with meter connections mounted thereon for removably receiving a meter in said connections, opposed side walls extending forwardly from opposite edges of said back wall, a top wall extending forwardly from said back wall and joining the upper ends of said side walls, a bottom wall extending forwardly from said back wall and joining the lower ends of said side walls, and a removable cover received by said side walls and top wall and bottom wall, said cover having an opening therein through which the glass portion of said meter projects when said meter is received in said connections, said meter when received in said connections being spaced from said bottom wall, the combination therewith of:
(a) liner means disposed between said back wall and said cover, said liner means having an upper portion abutting the base of said meter when it is installed in said connections; said liner means abutting said side walls and said bottom wall to close the portion of the meter box below the meter;
(b) lip means on the said liner means for directing water which enters the meter box forwardly and downwardly away from said connections; and,
(c) retaining means for removably retaining said liner in position.

References Cited
UNITED STATES PATENTS

| | | | |
|---|---|---|---|
| 2,044,643 | 6/1936 | Sloop | 317—107 |
| 2,582,638 | 1/1952 | Lewis | 317—107 |
| 2,782,387 | 2/1957 | Coleman | 200—51.1 |
| 3,123,744 | 3/1964 | Fisher | 317—104 |
| 3,142,001 | 7/1964 | Spencer et al. | 317—105 |
| 3,221,216 | 11/1965 | Kobryner | 117—104 |

ROBERT K. SCHAEFER, *Primary Examiner.*

D. SMITH, *Assistant Examiner.*